June 15, 1943.  A. L. THURSTON ET AL  2,321,955
PLOTTING DEVICE
Filed April 14, 1942  3 Sheets-Sheet 2
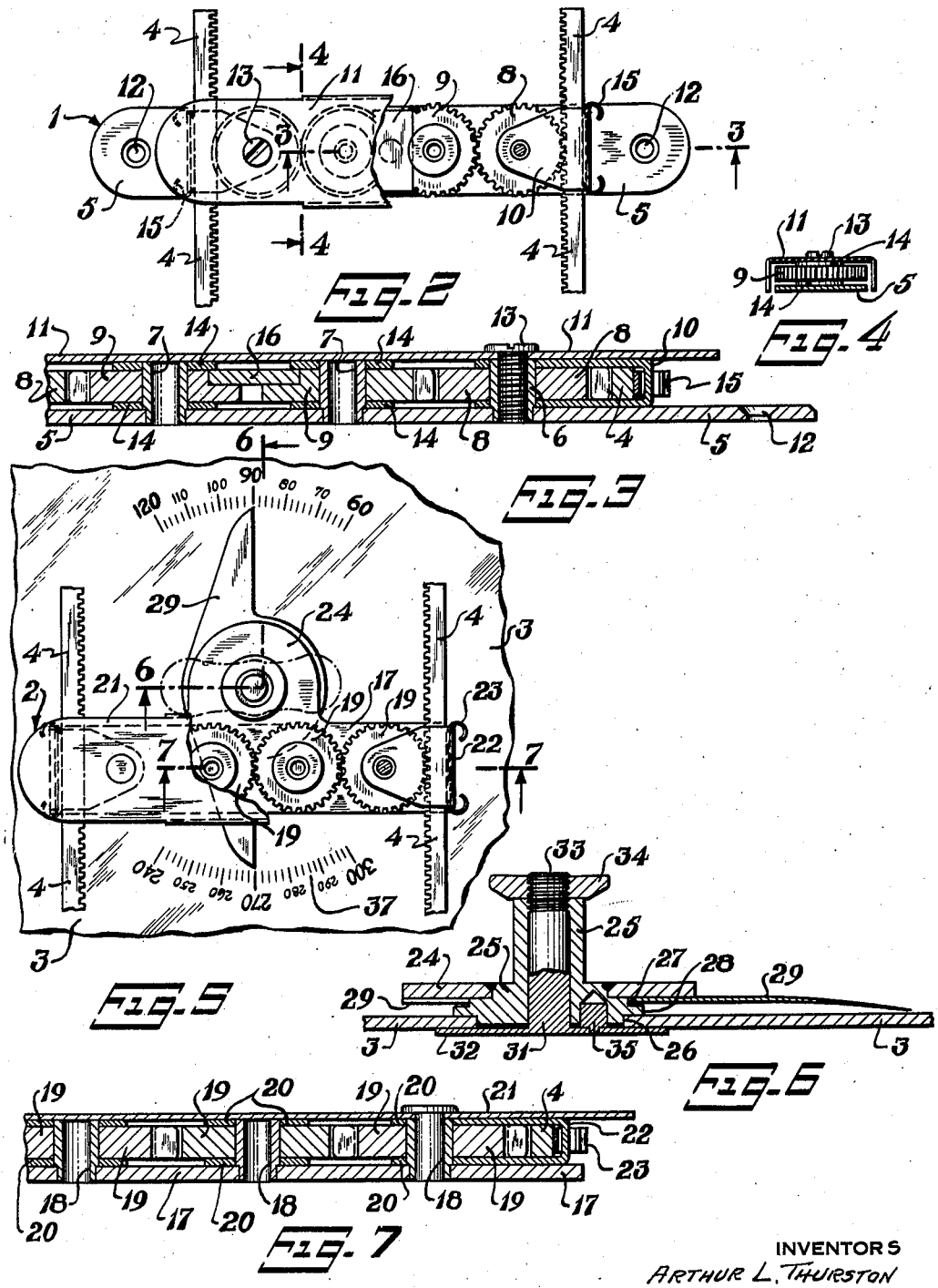
INVENTORS
ARTHUR L. THURSTON
BY BEAUREGARD SWEENEY
ATTORNEY June 15, 1943.  A. L. THURSTON ET AL  2,321,955
PLOTTING DEVICE
Filed April 14, 1942   3 Sheets-Sheet 3
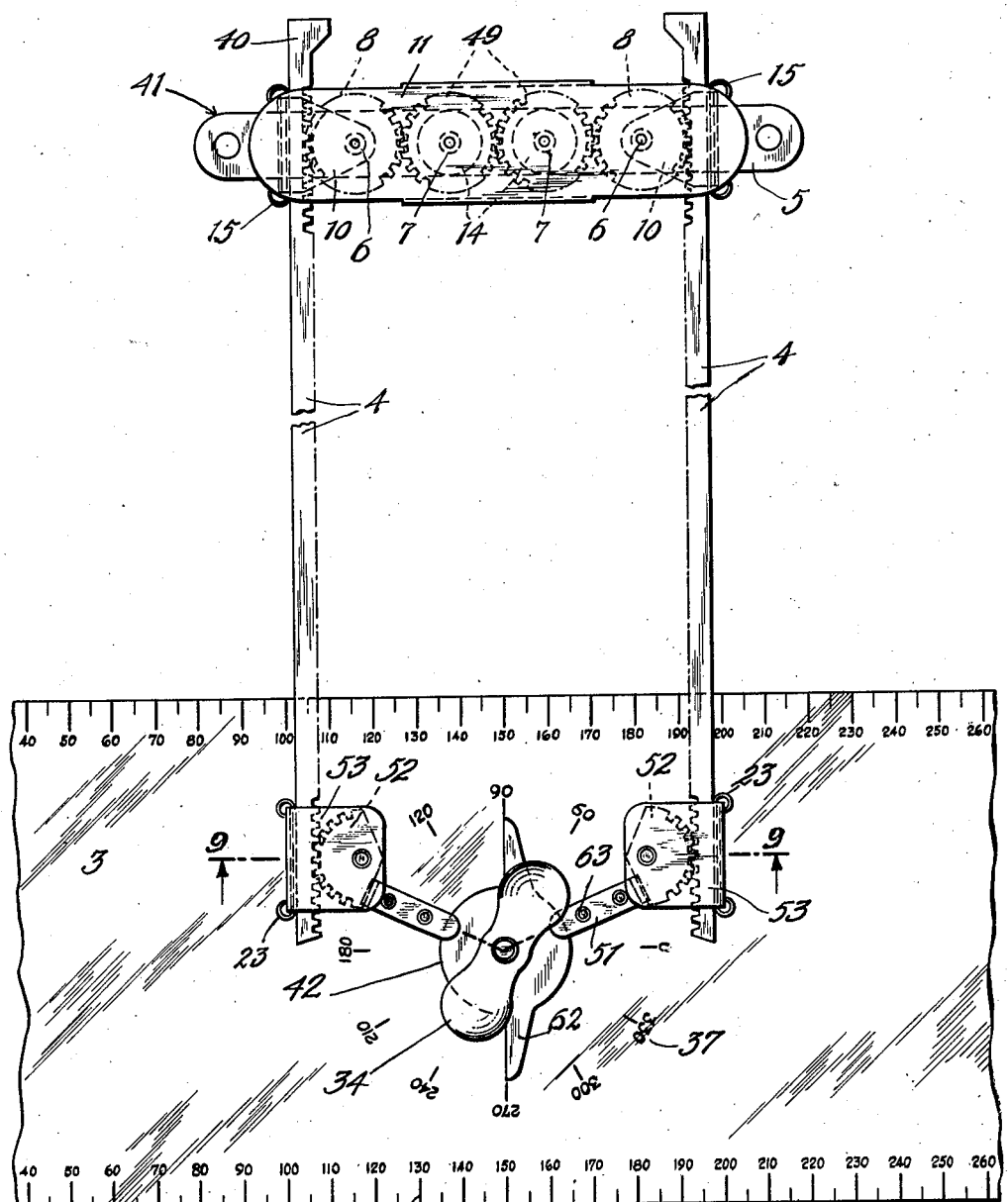
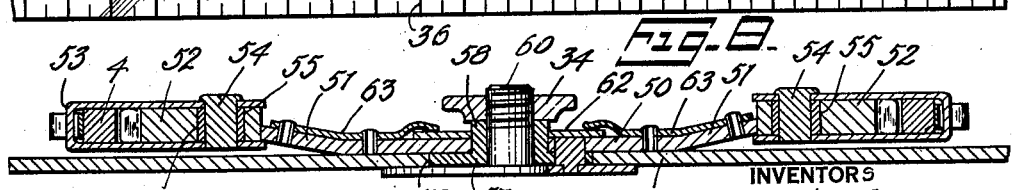
INVENTORS
ARTHUR L. THURSTON
BY BEAUREGARD SWEENEY
ATTORNEY Patented June 15, 1943

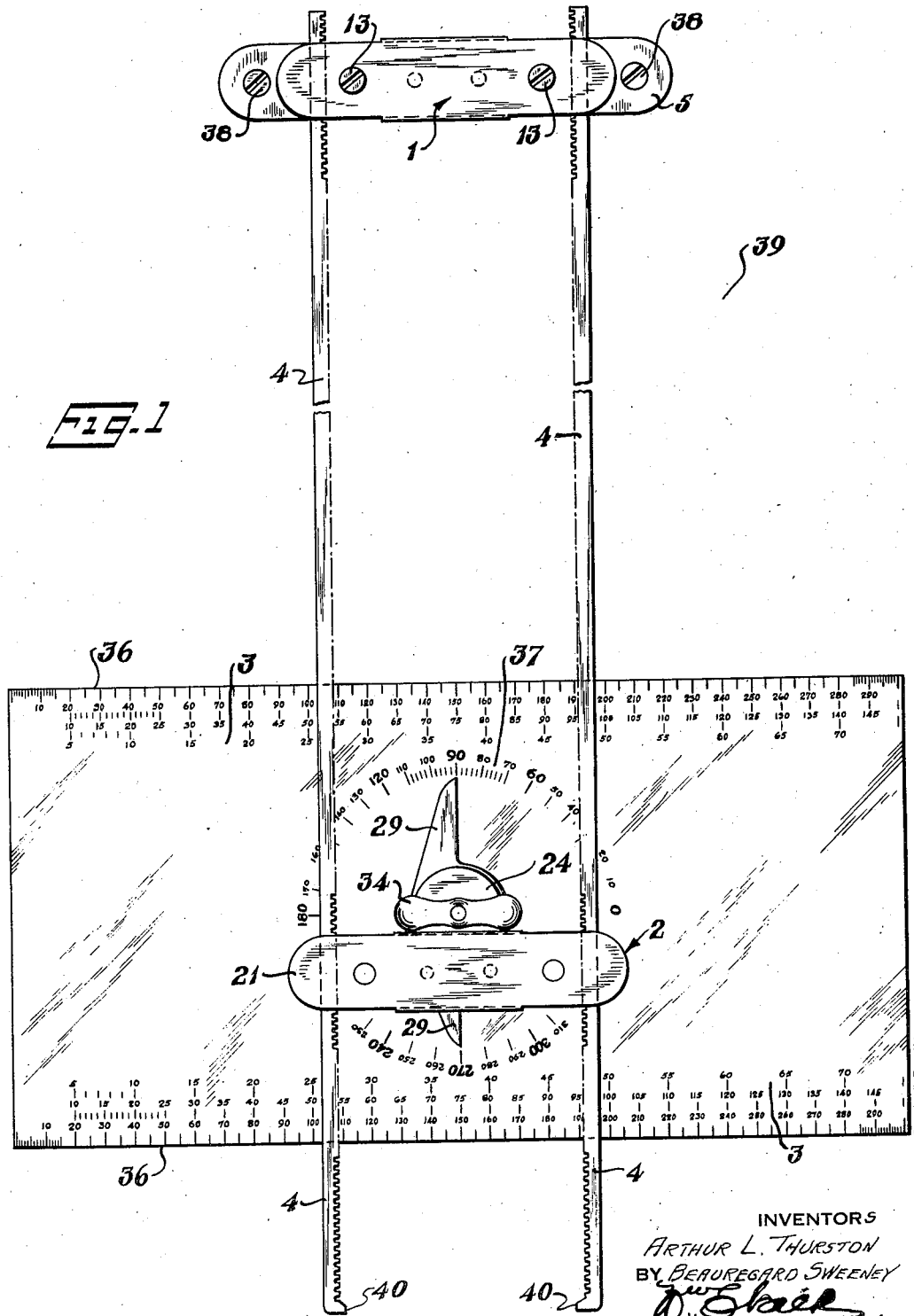

2,321,955

UNITED STATES PATENT OFFICE 2,321,955

PLOTTING DEVICE

Arthur L. Thurston, Wantagh, and Beauregard Sweeney, Great Neck, N. Y., assignors to Cox & Stevens Aircraft Corporation, Mineola, N. Y., a corporation Application April 14, 1942, Serial No. 438,966

4 Claims. (Cl. 33—79)

Our invention relates to drafting or plotting devices. It is especially, though not necessarily, designed for use in aircraft where weight must be kept to a minimum and space is more or less limited. More particularly, the invention relates to a parallel motion device for navigational plotting.

The object of the invention is to provide a light, compact device wherein a straight edge or ruler, as it is moved at will over the plotting surface, remains parallel to any preselected line or direction.

Previously known devices of this character have made use of a system of cords attached to the ruler or straight edge and running over pulleys, or of parallel linkages of one sort or another. The first of such devices has only a limited range of angular movement and is not suitable for navigational plotting. The latter, although satisfactory in some respects, is much too heavy for and cannot be used effectively in aircraft because of lack of space.

In the drawings, wherein like characters of reference denote like or corresponding parts throughout the several views:

Fig. 1 is a plan view of one embodiment of the invention shown attached to a plotting surface;

Fig. 2 is an enlarged plan view, partly broken away, of the so-called stationary member;

Figs. 3 and 4 are sectional views on the lines 3—3 and 4—4, respectively, of Fig. 2;

Fig. 5 is an enlarged plan view, partly broken away, of the so-called movable member;

Figs. 6 and 7 are sectional views on the lines 6—6 and 7—7, respectively, of Fig. 5;

Fig. 8 is a plan view of another embodiment of the invention, and

Fig. 9 is an enlarged section on line 9—9 of Fig. 8.

Referring to Fig. 1, the device comprises a fixed member 1 adapted for attachment to a drafting board or other plotting surface; a rider or movable member 2 carrying a plotter or ruler 3; and a pair of rack arms 4—4 joining the fixed and movable members.

The fixed member 1, (see Figs. 2 and 3) preferably comprises an attachment plate 5 bearing four studs or trunnions 6—6 and 7—7; four pinions 8—8 and 9—9 mounted on the studs; two rack retainers 10—10; and a cover plate 11. Holes 12 are formed in the attachment plate 5 for fastening the latter to the board by means of screws or bolts. The two outer studs 6—6 are tapped to take screws 13—13 which secure the cover plate 11 in place. Spacer washers 14—14, having the same thickness as that of the rack retainers 10—10 are used above and below the two inner pinions 9—9. A spring 15 holds each rack 4 in engagement with its associated outer pinion 8.

The two inner pinions 9—9 are locked together by any suitable means such as that shown, consisting of cutting away adjacent portions of the two pinions to receive a tie plate 16 and soldering the latter in place. All pinions are of the same diameter and pitch and the studs are so located that the adjacent pinions are in accurate mesh with each other.

Referring to Fig. 7, the movable member 2, it will be noted, is similar to the fixed member 1 in that it includes a body plate 17 bearing four studs 18, which carry four pinions 19 having the same diameter and pitch as those of the fixed member 1, and spacer washers 20, cover plate 21, rack retainers 22 and springs 23 which are the same as to structure and function as the corresponding parts of the fixed member. The pinions 19 in the movable member, however, are not locked but are free to rotate.

The body plate 17 is lobed as at 24. To this lobe is rigidly attached a hollow post member 25 on the lower end of which are two cylindrical bearing surfaces 26 and 27 separated by a spacer flange 28. A hole in the plotter member 3 fits smoothly on the surface 26 and a hole in a double-ended pointer member 29 fits smoothly on the surface 27.

The central portion of the pointer member 29 is pressed against the under surface of the body plate by one or more spring clips (not shown) secured to the latter, and the outer ends of said member are bent downward to lie on the upper surface of the plotter member 3. The indicating edges of the pointer member 29 are in a line passing through the center of rotation of the pointer.

A clamp member 31 with a wide flange 32 and a threaded end 33 is inserted in the hollow of the post member 25 and held by a winged clamp nut 34. The length of the cylindrical surface 26 is less than the thickness of the plotter member 3 so that when the nut 34 is tightened, the plotter member is held by being clamped between the flange 28 of the post member and the flange 32 of the clamp member. A stud 35 on the clamp member registers with a corresponding hole in the post member and prevents the clamp member from turning as the clamp nut 34 is turned.

The plotter member 3 is preferably made of transparent material and has scales of distance 36—36 inscribed along its upper and lower edges and a compass rose or scale of degrees 37 inscribed about its center. As noted above, it has a hole cut in its center to fit for free turning on the cylindrical bearing surface 26.

The rack arms 4 have teeth of the same pitch as those of the outer pinions 8 and 19. They are held in place by the retainers 10 and 22 and are urged into engagement with the pinions by the springs 15 and 23. Stops 40 are provided at the lower ends of the rack arms to keep the movable member 2 from sliding off these ends.

Referring to Fig. 8, an alternative arrangement of the device consists of a fixed member 41, a movable member 42, a plotter 3 and a pair of rack arms 4 joining the fixed and movable members.

The fixed member is similar to that of the embodiment shown in Figs. 1 to 4, and includes an attachment plate 5 bearing four studs 6—6 and 7—7, outer pinions 8—8, rack retainers 10—10, a cover plate 11, spacer washers 14—14 and springs 15—15. Instead of having the inner pinions locked however, freely turning pinions 49—49 are mounted on the inner studs 7—7. These pinions are identical with the outer pinions and are in mesh with the latter and with each other, their action being the same as that of the pinions in the movable member of the plotter shown in Figs. 1 to 7.

The movable member 42 includes a central plate 50 from which extend two arms 51—51. At the outer end of each of these arms there is rigidly attached, as by soldering, brazing or other suitable means, a segment of gear 52, of the same diameter and pitch as the pinions of the fixed member. The center spacing of these segments is the same as that of the outer pinions 8—8 of the fixed member. A rack retainer 53 is pivotally attached at the center of each of these segments, the attachment being by means of a rivet 54 and a spacer tube 55, the latter turning freely in a hole 56 in the center of the segment. The springs 23—23 hold the racks 4—4 in engagement with the segments.

A hollow post member 57 having its post portion 58 extending up through a hole in the center of the plate 50, is rigidly attached to the latter by soldering, riveting or other suitable means. The flange portion of the post member has an outer cylindrical surface 59 on which a hole in the plotter fits smoothly for turning. Means for clamping the plotter consisting of a flanged clamp member 60 and a winged clamp nut 34 are similar in construction and action to those described above for the movable member 2.

Turning on the post 58 is a double-ended pointer 62, the central portion of which is pressed against the plate 50 by means of two spring clips 63 riveted to the arms 51. The outer ends of the pointer are bent down to lie on the upper surface of the plotter.

The plotter and rack members are the same as for the example shown in Figs. 1 to 7 except that the latter are reversed so that the stops 40 are at the upper end to prevent the racks from sliding out of the fixed member.

From the foregoing it will be seen that one member—either the fixed or the movable—provides a fixed segment of gear teeth at each side while the other member has at each side a rotatable pinion, both members having means to hold the rack teeth in engagement with the gear teeth.

As the movable member is swung from side to side, the rack members turn on the fixed gears, and if this movement is merely swinging, the racks also turn through an equal travel on the outer rotatable pinions, so that the movable member has "parallel motion." If the movable member is moved toward and from the fixed member, the intermeshing of the rotatable gears insures that there will be equal motion along the two rack arms, so that this motion will also be "parallel." Since any motion of the movable member may be made up of a combination of these two motions, it is obvious that the movable member will remain "parallel" when moved to any position on the board.

To use the device for plotting, the edge of the pointer is aligned with the meridian on the chart which is readily visible through the transparent plotter. The clamp nut is then loosened and the plotter turned until the desired course or azimuth angle on the compass rose registers with the pointer edge and the clamp nut is tightened. The edge of the plotter may then be moved to any position on the chart for plotting this course.

The advantages of a plotting device characterized as above set forth are obvious and need not be again repeated. Suffice it to say that in aircraft navigation it finds its greatest utility.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. For use in association with a plotting surface, a plotting device including separate assemblies, one of which is adapted for attachment relatively to the plotting surface and the other of which is freely movable toward and away from the attached assembly; each said assembly comprising a mounting means and at least two gear elements, the gear elements of at least one said assembly being freely rotatable; and parallel rack bars connecting said assemblies and meshing each with at least one gear element of each assembly, said rack bars by their meshing engagement with said freely rotatable gear elements being adapted to admit of the movement of one said assembly toward and away from the other.

2. For use in association with a plotting surface, a plotting device including separate assemblies, one of which is adapted for attachment relatively to the plotting surface and the other of which is freely movable in an arcuate path over said plotting surface; each said assembly comprising a mounting means and at least two gear elements; and parallel rack bars connecting said assemblies and meshing each with at least one gear element of each assembly, said rack bars by their meshing engagement with said gear elements being adapted to admit of the arcuate movement of said movable assembly as aforesaid.

3. For use in association with a plotting surface, a plotting device including separate assemblies, one of which is adapted for attachment relatively to the plotting surface and the other of which is freely movable toward and away from the attached assembly as well as in an arcuate path over said plotting surface; one said assembly comprising a mounting means and a train of intermeshing freely rotatable gear elements and the other said assembly comprising a mounting means and at least two non-rotatable gear elements; and parallel rack bars connecting said assemblies and meshing each with at least one gear element of each assembly, said rack bars by their meshing engagement with said gear elements being adapted to admit of the arcuate movement of one said assembly and by their meshing engagement with said rotatable gear elements being adapted to admit of movement of one said assembly toward and away from the other.

4. For use in association with a plotting surface, a plotting device including separate assemblies, one of which is adapted for attachment relatively to the plotting surface and the other of which is freely movable toward and away from the attached assembly as well as in an arcuate path over said plotting surface; one said assembly comprising a mounting means and a train of intermeshing freely rotatable gear elements and the other said assembly comprising a mounting means and at least two non-rotatable gear elements; parallel rack bars connecting said assemblies and meshing each with at least one gear element of each assembly, said rack bars by their meshing engagement with said gear elements being adapted to admit of the arcuate movement of one said assembly and by their meshing engagement with said rotatable gear elements being adapted to admit of movement of one said assembly toward and away from the other, and spring means carried by each said assembly for holding said rack bars yieldingly in mesh with said gear elements in all positions of adjustment of said movable assembly.

ARTHUR L. THURSTON.
BEAUREGARD SWEENEY.